Figure 1:
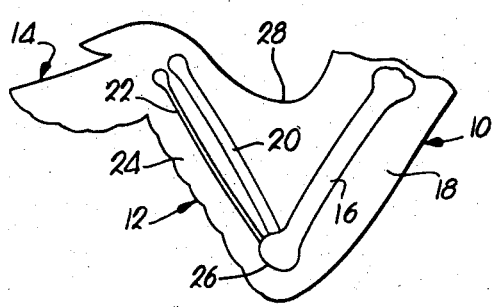

Nov. 26, 1968    J. L. STURM    3,412,425
METHOD OF PREPARING A FOWL WING
Filed Oct. 11, 1966

INVENTOR
James L. Sturm

BY Hovey, Schmidt, Johnson & Hovey
ATTORNEYS.

United States Patent Office 3,412,425
Patented Nov. 26, 1968

3,412,425
METHOD OF PREPARING A FOWL WING
James L. Sturm, 4513 Maxwell Road,
St. Joseph, Mo. 64506
Filed Oct. 11, 1966, Ser. No. 585,892
5 Claims. (Cl. 17—45)

This invention relates to a method of producing a pair of simulated drumsticks from a defeathered wing of a fowl.

The wing of a broiling or frying chicken, and oftentimes the wing of other fowl of similar size, is frequently a wasted part since it is regarded by many as being a less desirable piece of the chicken. A wing cannot be easily eaten without taking the piece in both hands and breaking it into its component parts for consumption of each part individually.

In direct contrast to the wing, the leg or drumstick of a fowl is a very desirable piece because of its appetizing appearance and the ease with which the drumstick can be eaten, either with a knife and fork or by grasping the piece with one hand. When eaten with the fingers, the drumstick may be handled in a neat and mannerly fashion due to the exposed bone at one end.

It is, therefore, the primary object of this invention to provide a method of preparing the wing of a fowl in a manner to produce a pair of simulated drumsticks ideal for use as hors d'oeuvres or the like.

As a corollary to the foregoing object, it is an important aim of this invention to provide a method of preparing the wing of a fowl to render the same appetizing and prevent wasting of the quality white meat characteristic of the wing.

In the drawing, which diagrammatically illustrates a defeathered wing of a chicken:

FIGURE 1 shows the piece in its normal form; and
FIGS. 2–6 diagrammatically illustrate the various steps of the method of the instant invention.

Referring to FIG. 1, the wing will be readily identified as comprising an innermost part 10, an intermediate part 12, and a tip 14. Part 10 has a single bone 16 covered with meat 18, and part 12 has a large bone 20 and a small bone 22, both covered with meat as illustrated at 24. Bones 16, 20 and 22 are interconnected at a joint 26, meat 18 and 24 being bridged by a web of skin 28.

Figure 2:
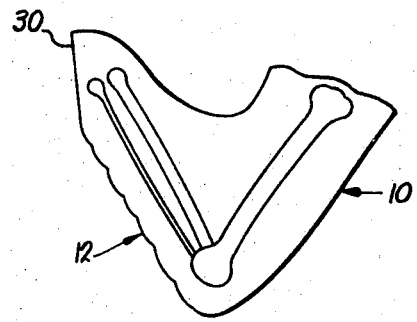
Figure 3:
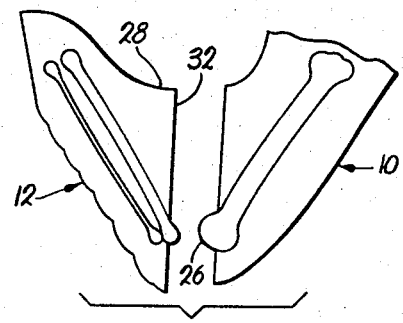
Figure 4:
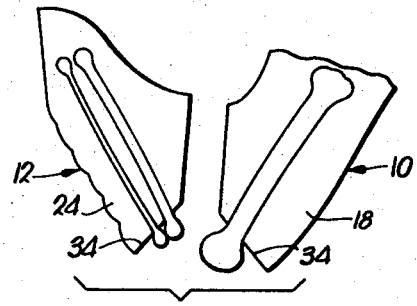

FIG. 2 illustrates that tip 14, being inferior, is detached and discarded, a cut 30 through the wing being made to sever tip 14 from intermediate part 12. Parts 10 and 12 are then separated by disjointing the same, as shown in FIG. 3. A cut 32 through web 28 centrally of joint 26 is made to cleanly separate the two parts.

Figure 5:
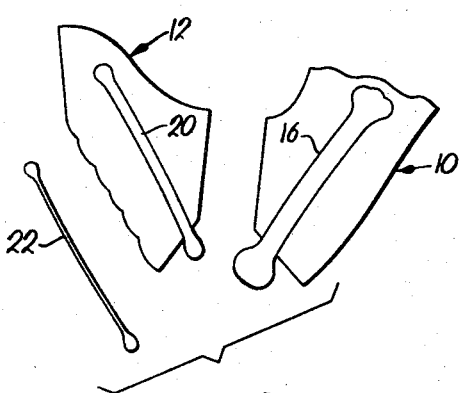

The next step is to free the meat 18 and 24 from the separated ends of bones 16, 20 and 22. This is effected by making two cuts as illustrated at 34 in FIG. 4 adjacent the previously joined ends of the three bones. With the meat thus freed, the smaller bone 22 is removed from part 12, leaving only the larger bone 20 therein as depicted in FIG. 5.

Figure 6:
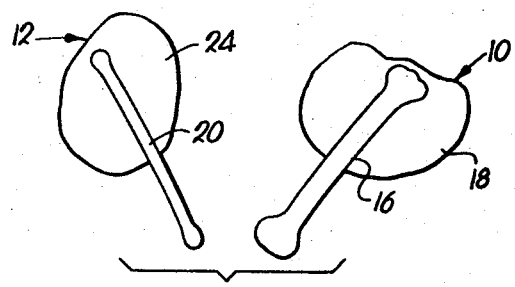

The final step is illustrated in FIG. 6. The end of bone 16 that previously formed joint 26 is grasped in one hand while the fingers of the other hand are utilized to push meat 18 along bone 16 toward the opposite end thereof until the meat is bunched into a ball at such opposite end as illustrated. It will be appreciated that this forms an enlarged mass at the opposite end of bone 16 which gives part 10 an appearance resembling a drumstick. In like fashion, the end of bone 20 which previously formed a part of joint 26 is grasped in one hand while the fingers of the other hand are used to push meat 24 toward the opposite end of bone 20 to form a ball-shaped mass as illustrated.

After the simulated drumsticks are prepared, they may be fried in the same manner as a normal piece of chicken or other fowl. It will be appreciated that the portion of the bone protruding from the ball of meat of each simulated drumstick provides a convenient handle for use during eating of the meat.

Having thus described the invention, what is claimed as new and desired to be secured by Letters Patent is:

1. A method of producing at least one simulated drumstick from a defeathered wing of a fowl wherein the wing has a bone covered with meat, said method comprising the steps of:
  separating said bone and said meat from the remainder of said wing; and
  shifting said meat along the bone from one of its ends toward the opposite end thereof until said meat is formed into an enlarged mass at said opposite end.

2. The invention of claim 1, and producing a second simulated drumstick from said remainder of the wing, wherein said remainder includes a pair of additional bones covered with meat, together with a wing tip, the steps of:
  removing one of the additional bones from said remainder;
  detaching said tip from said remainder; and
  shifting the meat on the other of the additional bones along the latter from one of its ends toward the opposite end thereof until the meat thereon is formed into an enlarged mass at said opposite end of said other additional bone.

3. The invention of claim 2, and:
  prior to shifting, freeing the meat from said one end of each bone respectively upon which a mass is formed.

4. The invention of claim 2, wherein said wing has a joint connecting the first-mentioned bone with the additional bones, said separating of the first-mentioned bone and its meat from said remainder including:
  disjointing the first-mentioned bone from the additional bones.

5. The invention of claim 1, and:
  freeing said meat from said one end of the bone prior said shifting.

References Cited

UNITED STATES PATENTS

| | | | |
|---|---|---|---|
| 2,897,536 | 8/1959 | Bergstrom et al. | 17—1 |
| 2,992,924 | 7/1961 | Kelly | 99—107 |
| 3,233,282 | 2/1966 | Segur | 17—45 |

LUCIE H. LAUDENSLAGER, *Primary Examiner.*